United States Patent [19]

Berry

[11] Patent Number: 5,383,688
[45] Date of Patent: Jan. 24, 1995

[54] CONDUIT LINER

[75] Inventor: Richard C. Berry, Camillus, N.Y.

[73] Assignee: Cooper Industries, Inc., Houston, Tex.

[21] Appl. No.: 68,760

[22] Filed: May 28, 1993

Related U.S. Application Data

[63] Continuation-in-part of Ser. No. 795,707, Nov. 21, 1991, abandoned.

[51] Int. Cl.$^6$ ............................................. F16L 55/00
[52] U.S. Cl. ..................................... 285/49; 285/55; 285/345; 277/178; 174/83
[58] Field of Search ..................... 285/45, 55, 34, 345, 285/48, 49, 50; 174/65 G, 157 G, 83; 277/178

[56] References Cited

U.S. PATENT DOCUMENTS

| | | | |
|---|---|---|---|
| 1,775,128 | 9/1930 | Hunter | 174/83 |
| 1,808,542 | 6/1931 | Ginsburg | 174/83 |
| 1,850,792 | 3/1932 | Frederickson | 174/83 |
| 2,143,477 | 1/1939 | Dillon et al. | 285/55 X |
| 2,209,274 | 7/1940 | Jaberg | 174/83 |
| 2,338,316 | 1/1944 | Buzzell | 285/48 X |
| 2,470,886 | 5/1949 | Buzzell | 174/83 |
| 3,219,368 | 11/1965 | Crumpler | 285/55 X |
| 3,467,764 | 9/1969 | Knapp | 174/74 R |
| 3,643,290 | 2/1972 | Milne | 174/83 |
| 3,836,698 | 9/1974 | Bawa | 174/83 |
| 4,009,988 | 3/1977 | Duperow et al. | 285/49 X |
| 4,166,479 | 9/1979 | Cleavenger | 285/55 X |
| 4,192,477 | 3/1980 | Decky et al. | 285/48 X |
| 4,232,712 | 11/1980 | Squire | 138/109 |
| 4,293,138 | 10/1981 | Swantee | 285/345 X |
| 4,535,196 | 8/1985 | Milne | 174/83 |
| 4,752,652 | 6/1988 | Danti et al. | 174/83 |
| 4,912,285 | 3/1990 | Falciglia | 174/83 |
| 4,995,427 | 2/1991 | Berchem | 285/55 X |
| 5,169,180 | 12/1992 | Villoni et al. | 285/55 X |

FOREIGN PATENT DOCUMENTS

| | | | |
|---|---|---|---|
| 203571 | 5/1959 | Austria | 174/83 |
| 0074486 | 7/1952 | Denmark | 174/83 |
| 1071180 | 5/1955 | Germany . | |
| 0828562 | 12/1959 | Germany | 174/74 |
| 1250518 | 9/1967 | Germany | 174/83 |
| 456333 | 11/1936 | United Kingdom | 285/345 |
| 2044379 | 10/1980 | United Kingdom | 285/345 |

Primary Examiner—Dennis L. Taylor
Assistant Examiner—Heather Chun Shackelford
Attorney, Agent, or Firm—Laff, Whitesel, Conte & Saret, Ltd.

[57] ABSTRACT

A conduit liner having a continuously cylindrical body having a first opening and diametrically opposed second opening, a flange which extends circumferentially around the first opening and which is integrally formed with the body, a hollow interior to encapsulate at least one wire extending through the conduit, and a plurality of flexible and collapsible fins extend along and protrude from an external surface of the body.

7 Claims, 2 Drawing Sheets

CONDUIT LINER

FIELD OF THE INVENTION

This is a continuation in part of U.S. application Ser. No. 07/795,707 filed Nov. 21, 1991 now abandoned.

This invention relates to a conduit liner. More particularly, this invention relates to a conduit liner and method for providing a smooth conduit entry which eliminates the need for a bushing and/or fitting and which may be installed in the field.

BACKGROUND OF THE INVENTION

Electric wires or cables may be received and protected by a variety of mechanisms including conduits which are typically insulated at their ends with bushings or other insulating devices to permit compliance with the National Electrical Code (NEC). In particular, the NEC requires that ungrounded conductors of No. 4 or larger be protected from abrasion by a substantial bushing which provides a smooth rounded insulating surface. An exception to this bushing requirement would be the presence of threaded hubs or bosses that are an integral part of the enclosure and which provide a smooth rounded or flared entry for conductors.

Irrespective of the insulating mechanism, conduits are often found entering walls of enclosure and are mounted into the enclosures by one of three methods.

The first method involves mounting a conduit in a knockout or sliphole of an enclosure wherein it may be secured by a single or double locknut. A bushing is screwed or set-screwed into the end of the conduit which protrudes into the enclosure.

The second method entails screwing a conduit into a thin walled enclosure and requires drilling and tapping the opening of the enclosure with a taper tap so that the conduit protrudes into the enclosure. A bushing is fastened to the end of the conduit that protrudes into the enclosure. Alteratively, a reducer may be utilized with the conduit to provide an integral bushing.

The third method involves screwing a conduit into a drilled and taper tapped conduit entry in a thick walled enclosure, such as an explosion-proof enclosure. This method may be accomplished by: employing a reducer with an integral bushing; machining an integral bushing into the enclosure; or counterboring the opening of the enclosure such that the conduit protrudes sufficiently into same and a bushing may be installed on the end of the conduit.

In addition to the above three methods, a fourth method involves using insulating throat liners in conduits. For example, in U.S. Pat. No. 2,947,800 (Badeau), a permanent, factory-installed, tubular liner is placed in the throat of the conduit and cable fittings. The Badeau liner, however, requires an internal recess or flange in the conduit fitting for containment.

While the aforementioned methods and associated products function to provide a conduit with a bushing that complies with the NEC, there are problems associated with their use. For example, the third method generally requires extensive machining operations to form the conduit entry which elevates the cost and delays the completion time. Furthermore, these methods typically require the presence of fittings and internal bushings that are affixed to the ends of the conduits which protrude into the enclosures. Moreover, these methods necessitate mounting the conduits into an enclosure so that bushings may be attached thereto.

Likewise, the fourth method requires a liner which is permanent and factory installed and further requires the presence of a fitting for attachment purposes.

These requirements are also prohibitively costly and time consuming.

Despite the numerous disadvantages and limitations with the above methods and their respective apparatuses, conduits are still generally mounted and insulated as described above. Thus, while these methods and bushings provide a means to insulate and provide smooth conduit entry, they are not adequate to meet the needs of the art. Moreover, these methods and bushings are generally expensive to use and all are restrictive in their use.

Accordingly, it is an object of the present invention to provide a method for producing a smooth conduit entry and a conduit liner having a plurality of flexible collapsible locking fins extending outwardly from the outer surface of the liner.

It is another object of the present invention to provide a method for producing a smooth conduit entry and a conduit liner which may be inserted into the open end of a conduit and the liner having a plurality of integral collapsible locking fins having a thickness of less than 0.03 inches.

It is another object of the present invention to provide a method for producing a smooth conduit entry and a conduit liner which may be inserted into the open end of a conduit that does not have a fitting and said liner having a plurality of their locking fins which collapse when the liner is inserted into the conduit such that one side of the liner contacts the liner outer walls and the other side of the liner contacts the inner walls of the conduit.

Other objects and advantages of the present invention will become more apparent as described hereinafter.

SUMMARY OF THE INVENTION

The present invention embodies a method and structure that accomplishes the foregoing objects by providing a removable bushing or liner having a generally cylindrical body which has an outwardly and circumferentially extending flange means at its one end that abuts an outer rim of a conduit. Along the outer surface of the liner are a plurality of fins which are flexible. The inventive liner is inserted into the open end of the conduit by longitudinally sliding its non-flanged end into the conduit until the oppositely positioned flange means abuts the conduit rim.

The liner fins when not inserted in the conduit project outwardly from the outer surface of the liner at a radial distance or a sufficient distance to provide a locking action when the liner is inserted into the conduit. The liner fins are sufficiently thin to collapse or bend to have one side substantially flush with the outer surface of the liner and the other side substantially in contact with the inner surface of the conduit to secure or lock the liner in the conduit. Because the inner surface of an electrical conduit is not uniform, on some liners a portion of the outer body surface of the liner as well as the sides of the collapsed fins contact the inner surface of the conduit.

In a preferred embodiment, the liner is made from a plastic insulating material and includes integrally formed flexible thin fins on its external surface. The fins provide a locking or securing means and generally extend longitudinally, radially or coaxially. When the liner is inserted into the conduit, the fins collapse or bend to secure the liner within the conduit. The fins are flexible and collapsible for maximizing both the inner and outer diameters of the liner.

When our liner is used, the liner does not change the inner diameter code requirements of a standard conduit. Our liner size stays within the code inner diameter range.

The liner may be constructed from an acetal copolymer such as Celcon M90-04, which is manufactured by the Celenese Plastic Company or, alternatively, from a polypropylene molding compound, such as the glass reinforced grade MF-1002 H.S., which is produced by the Liquid Nitrogen Processing Corporation.

The flexible fins are sized to provide the advantages noted above. The preferred dimensions of the fins are side walls which have a height or width of at least about 0.07 inches and a thickness of from about 0.01 to about 0.03 inches and a length of the liner and preferably greater than 75% of the length of the liner. The practical upper range of the fin width is about 0.2 inches.

The inventive method and conduit liner will become more apparent from the following description taken in conjunction with the attached drawings illustrating a preferred embodiment wherein:

DETAILED DESCRIPTION OF THE INVENTION

Figure 1:
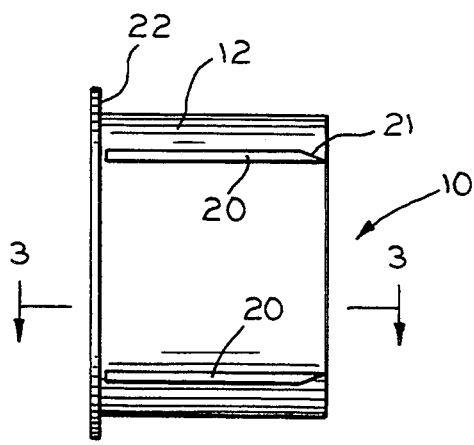
FIG. 1 is a side view of the inventive liner.
Figure 2:
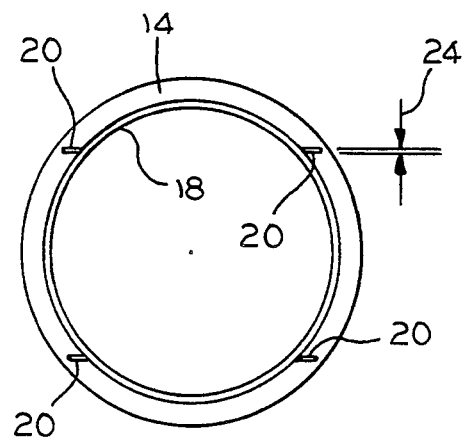
FIG. 2 is a front view of the liner of FIG. 1.
Figure 3:
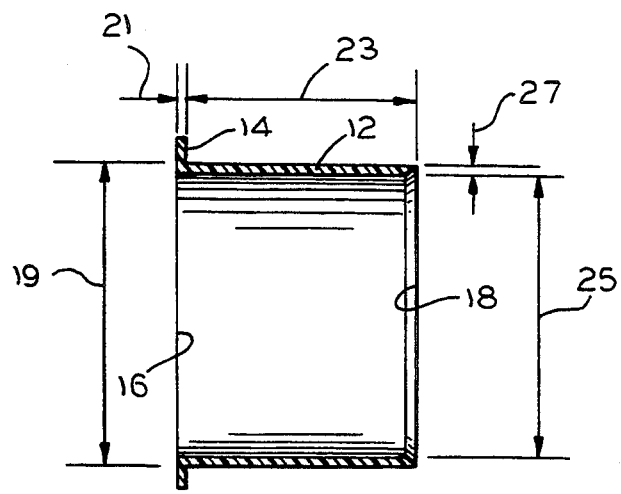
FIG. 3 is a side cross-section view of the liner taken along lines 2—2 of FIG. 1.

FIGS. 1–3 show a liner 10 having a generally elongated, hollow, continuously cylindrical body 12, a flange 14, a first opening 16 defined by the flange 14 at one end of the body 12 and a second opening 18 at the other end of the body 12. The internal surface of liner 10 is smooth, whereas its external surface has a plurality of flexible collapsible fins 20. The liner is preferably a one-piece plastic article having a non-split body. The flange 14 is integrally formed with body 12 and circumferentially extends and outwardly projects from one end of body 12. The opening 16 preferably has contoured or rounded edges to prevent abrasion of the wire(s) that are pulled through the conduit entry 16.

Flange 14 has a flat surface 22 and projects perpendicularly out from the one end of the body 12 at about 90°. The inner surface 22 of the flange 14 will abut the end of the conduit or wall when inserted into the conduit.

The flexible collapsible locking fins 20 extend longitudinally along body 12 between first opening 16 and second opening 18. The fins have opposite side walls which have a width or height 26 of about at least 0.07 inches and up to about 0.20 inches prior to the insertion of the liner into the conduit.

The thickness 24 of the fins is preferably from about 0.01 to about 0.03 inches.

Figure 11:
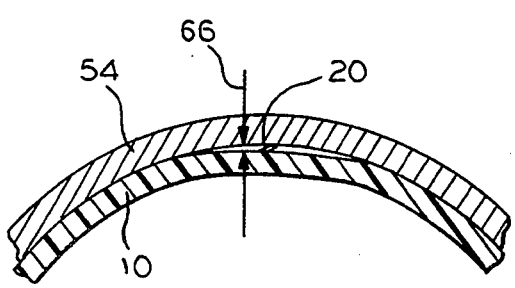
FIG. 11 is an enlarged cross-sectional view taken along lines 11—11 of FIG. 8.

As shown in FIG. 11, when the liner 10 is inserted into the conduit, the fins 20 bend so that one fin side wall contacts the surface of body 12 and the other fin side wall contacts the inner surface of the conduit. Since the fins 20 are thin, the liner inner diameter 25 meets the code standards for the inner diameter of the conduit and the conduit does not have to be machined to accommodate the liner and meet the code standards. The liner is made to fall within the tolerances provided by the code standards for electrical conduits. As shown in FIG. 11 which approximates a 4-inch liner, the liner outer surface contacts the inner surface of the conduit except for spaces adjacent the fins 20.

Figure 8:
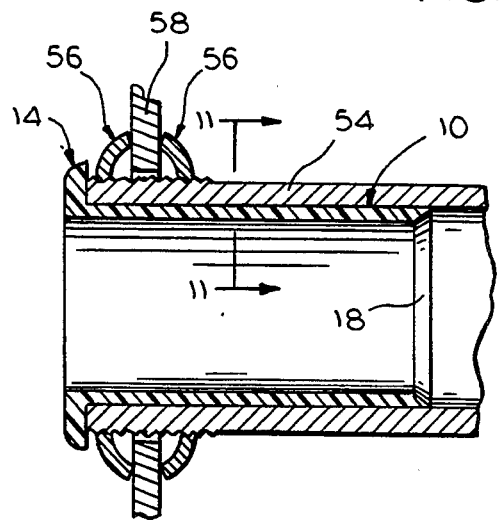
FIG. 8–10 are side cross-sectional views of the inventive liner inserted into conduits mounted on wall enclosure.

FIGS. 1 to 3 show fins 20 on the liner prior to its insertion into the conduit. As shown in FIG. 1, the ends 21 of fins 20 adjacent second opening 18 are downwardly tapered so that the liner may be easily inserted into the conduit. Subsequent to the insertion of the liner into the conduit, the flexibly collapsible fins collapse towards and are substantially flush with the body of the liner. The collapsed fins 20 securely fix the liner within the conduit, as shown in FIG. 8.

The preferred liner dimensions for various size liners are as follows when referring to FIG. 3 with the nominal dimension being in inches:

| Trade Size | Lngth. 23 | Wall 27 | Outside Diameter 19 | Fins 24 | Flange Thickness 21 | Inside Diameter 25 |
|---|---|---|---|---|---|---|
| ½ | 1.125 | .020 | .622 | .010 | .06 | .567 |
| ¾ | 1.50 | .020 | .814 | .010 | .06 | .753 |
| 1 | 2.00 | .030 | 1.043 | .015 | .07 | .954 |
| 1¼ | 2.00 | .040 | 1.374 | .015 | .07 | 1.260 |
| 1½ | 2.50 | .050 | 1.604 | .015 | .08 | 1.460 |
| 2 | 2.50 | .050 | 2.032 | .020 | .08 | 1.888 |
| 2½ | 2.75 | .060 | 2.437 | .020 | .08 | 2.269 |
| 3 | 2.75 | .060 | 3.056 | .025 | .09 | 2.888 |
| 3½ | 3.00 | .060 | 3.540 | .025 | .09 | 3.368 |
| 4 | 3.00 | .060 | 4.020 | .025 | .09 | 3.848 |

Figure 4:
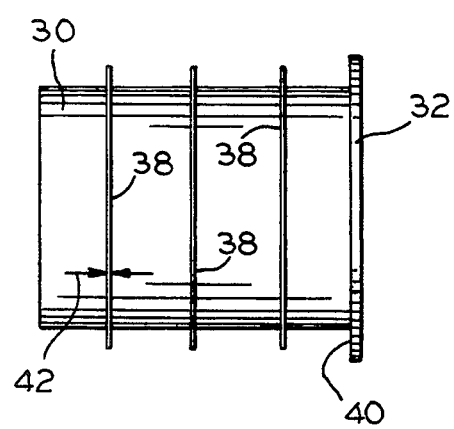
FIG. 4 is a side view of another embodiment of the inventive liner.
Figure 5:
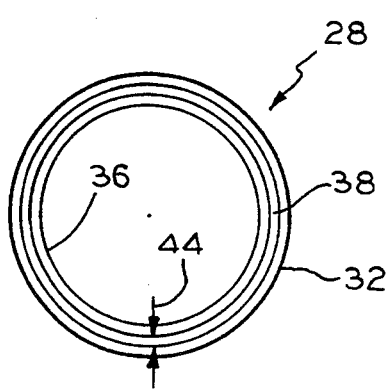
FIG. 5 is a rear view of the liner of FIG. 4.
Figure 6:
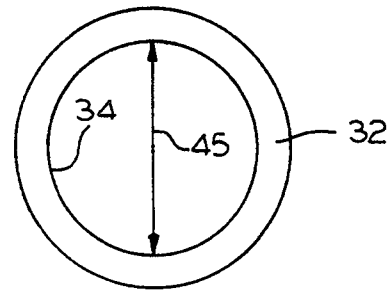
FIG. 6 is a front view of the inventive liner of FIG. 4.
Figure 10:
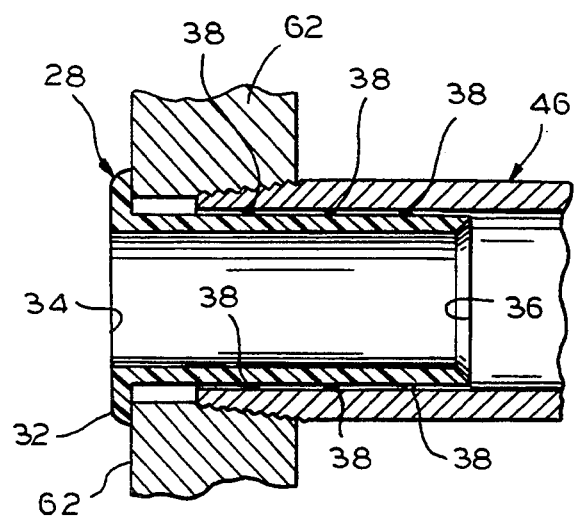

In FIGS. 4 to 6, there is shown another liner 28 having a tubular body 30. The liner 28 has two open ends with an opening 34 defined by a flange 32 extending from one end. The flange 32 is the same as the flange 14 and the opening 34 has contoured or rounded edges. The other end of the liner defines the opening 36. The outer surfaces has a plurality of lock fins 38 extending from the outer surface tubular of the tubular body 30. The fins 38 preferably extend circumferentially about body 30 and have side walls that project radially outwardly for a distance 44 of at least about 0.07 inches. The practical upper limit is about 0.20 inches from the outer surface of the body prior to the insertion of the liner into the conduit. The thickness 42 of the coaxial fins 38 are from about 0.01 to about 0.03 inches. Generally, when the liner is inserted into the conduit, the fins 38 collapse towards first opening 34 as illustrated in FIG. 10. One side wall of the fins 38 contacts the inner surface of the conduit 46 and the other side wall of the fin 38 contacts the outer surface of the liner body 30. As with the longitudinal fins 20, the liner is within the code standards for the inner diameter of the conduct.

Any number fins 20 and 38 may be included on body 12 and 30 respectively and may be positioned or spaced in any configuration. However, to provide a means for substantially locking the liner in the conduit there should be at least three fins. Both types of fins are especially useful for securing the liner to the conduit.

Figure 7:
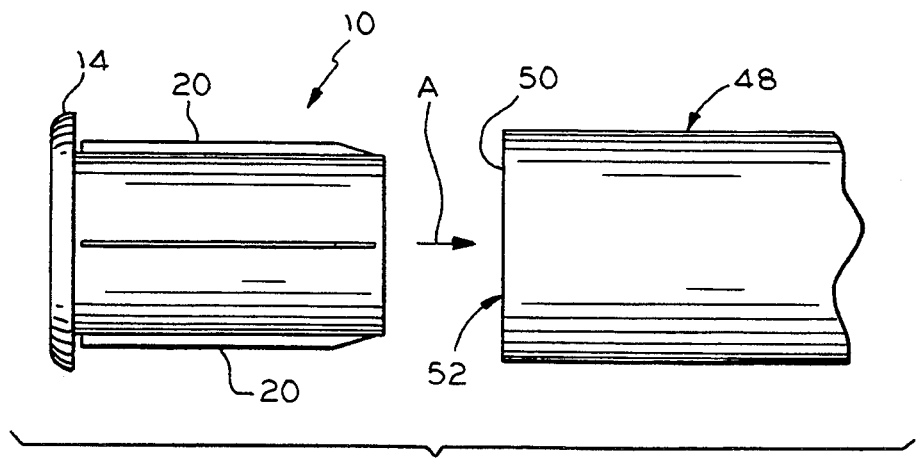
FIG. 7 is a side view of one of the inventive liners being inserted into a conduit.

FIG. 7 illustrates the manner in which liner 10 is inserted into a conduit 48. Liner 10 is first positioned in a generally parallel relation to conduit 48 with second opening 18 of liner 10 directly facing opening 50 of conduit 48. Next, liner 10 is inserted into opening 50 of conduit 38 in the direction indicated by arrow A. Liner 10 is inserted into conduit 48 until flange 14 abuts conduit rim 52 which prevents liner 10 from further insertion into the conduit. Liner 10 encapsulates and insulates wires or other similar components which are housed in conduit 48. Liner 28 of FIGS. 4–6 is inserted into the conduit in the same manner as described above for liner 10.

FIGS. 8 through 11 show additional applications of the liner. Not only may the liner be used independently with conduits, but it may also be used in conduits which are mounted into wall enclosures. For example, FIG. 8 shows liner 10 inserted into a conduit 54 which has been mounted with a double locknut 56 into a wall enclosure 58. In contrast to the wall mounted conduits of the prior art, the presence of liner 10 eliminates the need for a bushing on the end of conduit 54 adjacent to conduit opening. Likewise, liner 28 may also be used in the above settings.

Figure 9:
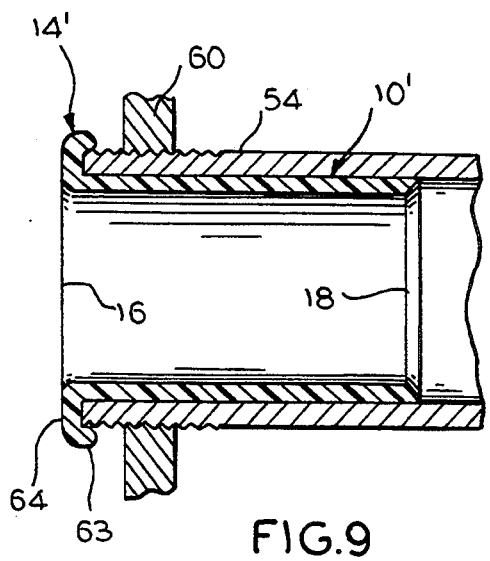

FIG. 9 also shows liner 10' inserted into conduit 54 which has been screwed into a wall enclosure 60. Again, because of the presence of liner 10', it was unnecessary to attach a bushing to the end of conduit 54. Liner 10' is identical to liner 10 except it has a flange 14' that wraps around the conduit as set forth hereinafter.

Similarly, FIG. 10 shows another conduit 46 which has been screwed into a conduit entry in a thick walled enclosure 62. Conduit 46 has a tapered threaded end that is screwed into the enclosure opening. The conduit liner 28 is inserted at the job site and is sufficiently long so that flange 32 abuts against one side of thick wall 62 and its body 30 extends a sufficient distance within conduit 46. Liner 28 provides a smooth surface for drawing wire into the conduit entry. Liner 20 has coaxial fins 38. The fins 38 are collapsed. As with the conduit mounts shown in FIGS. 9 and 10, a bushing was not necessary.

Referring to FIG. 9, flange 14' frames first opening 16 of liner 10. The outer surface 26 of flange 14' is contoured so that its outermost edge forms a lip 63 which curves toward the second opening 18. The curve of lip 63 is such that it creates a groove on its innermost surface or the surface which is opposite to outer surface 64. The groove is sized to conform to the thickness of the conduit and lip 63 spreads slightly when conduit rim abuts the groove. Thus, the flange 14' is specifically constructed so that lip 63 and groove are adapted to abut and grip conduit rim.

The diameter of liner 10, 10' in each of the embodiments may be adjusted to accommodate any conduit size. Specifically, the outer diameter of the conduit liner is substantially the same as the inner diameter of the conduit. This is because the liner is made of a plastic that will slightly deform to accommodate the collapsed fins.

A typical liner 10 for a 4" rigid steel conduit is a one-piece plastic liner having a body length of about 3 inches, a flange thickness 21 of about 0.09 inches. The outer diameter 19 of the liner body is about 4.02 inches, the inner diameter 25 of the liner is about 3.848 inches, and the inner diameter of the conduit is about 4.026 inches. The fins are longitudinal and have a width of about 0.20 inches wherein that portion of the fin having a width greater than 0.07 inches extends for at least 1.5 inches. The thickness 27 of the fin is about 0.025 inches.

These dimensions would be the same for liner 28. Therefore, the preferred maximum space 66 (FIG. 11) between the liner outer wall adjacent the collapsed fins would be about 0.015 to about 0.02 inches. Therefore, in a preferred embodiment, the outer diameter of the liner is substantially equal to the inner diameter of the conduit and the inner diameter of the liner is within the code tolerance for the inner diameter of the conduit.

Moreover, while the conduit liners 10 and 28 have been described in terms of approximate measurements of some of the components, it should be understood that the size of the liners and their respective components may vary according to the size of the conduits.

Therefore, it should be recognized that, while the invention has been described in relation to a preferred embodiment thereof, those skilled in the art may develop a wide variation of structural details without departing from the principles of the invention. Accordingly, the appended claims are to be construed to cover all equivalents falling within the true scope and spirit of the invention.

The invention claimed is:

1. A one-piece plastic electrical conduit liner having a tubular body with two open opposite ends,
   said tubular body having an outer diameter substantially equal to an inner diameter of a conduit it is to be inserted into,
   a plurality of flexible and collapsible fins extending from the outer surface of said body, said fins each having two opposite side walls wherein when said liner is inserted into said conduit, one fin side wall contacts the outer surface of the liner body and the other fin side wall contacts an inner surface of said conduit.

2. The liner of claim 1 wherein said liner has at least three fins and said fins have a thickness of from about 0.01 to about 0.03 inches and a width of at least 0.07 inches.

3. The liner of claim 2 wherein said fins extend longitudinally along at least 75% of the length of said liner body.

4. The liner of claim 2 wherein said fins extend circumferentially from said body.

5. The liner of claim 4 wherein said fins extend circumferentially around said liner body.

6. The liner of claim 5 wherein there are at least three longitudinally spaced fins.

7. The liner of claim 2 wherein said fins extend longitudinally along at least 50% of the length of said liner body.

* * * * *